(12) United States Patent
Sebire et al.

(10) Patent No.: US 9,554,312 B2
(45) Date of Patent: Jan. 24, 2017

(54) MESSAGE TRANSFER FOR IN-BAND SIGNALING MESSAGES IN RADIO ACCESS NETWORKS

(75) Inventors: Benoist Sebire, Tokyo (JP); Vinh Van Phan, Oulu (FI); Merja Vuolteenaho, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1352 days.

(21) Appl. No.: 12/213,833

(22) Filed: Jun. 25, 2008

(65) Prior Publication Data

US 2009/0046659 A1    Feb. 19, 2009

Related U.S. Application Data

(60) Provisional application No. 60/929,369, filed on Jun. 25, 2007.

(51) Int. Cl.
  *H04B 7/00* (2006.01)
  *H04W 36/02* (2009.01)
  *H04W 28/06* (2009.01)
  *H04W 92/04* (2009.01)

(52) U.S. Cl.
  CPC .............. *H04W 36/02* (2013.01); *H04W 28/06* (2013.01); *H04W 92/045* (2013.01)

(58) Field of Classification Search
  CPC ..... H04W 76/02; H04W 76/04; H04W 76/046
  USPC ....... 370/310, 312, 328, 329, 331, 464–466; 709/227, 228, 230, 249
  See application file for complete search history.

(56) References Cited

U.S. PATENT DOCUMENTS

| | | | |
|---|---|---|---|
| 6,614,810 B1 | 9/2003 | Lee et al. | |
| 7,333,443 B2* | 2/2008 | Beckmann et al. | 370/254 |
| 7,394,778 B2* | 7/2008 | Kim | 370/312 |
| 7,415,046 B2* | 8/2008 | Beckmann et al. | 370/537 |
| 7,571,358 B2* | 8/2009 | Yi et al. | 714/48 |
| 2004/0146067 A1* | 7/2004 | Yi et al. | 370/474 |
| 2004/0156330 A1* | 8/2004 | Yi et al. | 370/328 |
| 2008/0311923 A1* | 12/2008 | Petrovic et al. | 455/450 |

FOREIGN PATENT DOCUMENTS

| | | |
|---|---|---|
| CN | 1310896 A | 8/2001 |
| EP | 1781057 A1 | 10/2005 |

OTHER PUBLICATIONS

3GPP TSG-RAN2 meeting #58, R2-072339, 3GPP, May 2007, pp. 1-8.*
3GPP TSG-RAN2 meeting #58, R2-072338, 3GPP, May 2007, pp. 1-45.*
3GPP TSG-RAN2 meeting #55bis, R2-072344, 3GPP, Mar. 2007, pp. 1-86.*

(Continued)

*Primary Examiner* — Dmitry H Levitan
(74) *Attorney, Agent, or Firm* — Squire Patton Boggs (US) LLP (57) ABSTRACT

A method and apparatus for handling in-band signaling messages in radio access networks is provided. The method and apparatus may setup a logical channel, where the logical channel provides packet data control protocol in-band signaling for radio bearers, provide a unique logical channel identifier for the logical channel, receive a packet with a logical channel identifier tag and identify a packet data unit of the packet as a signaling packet data unit.

22 Claims, 6 Drawing Sheets

(56) References Cited

OTHER PUBLICATIONS

Ericsson, Nokia, NSN: "Introduction of Improved L2 Support for High Data Rates and Enhanced CELL_FACH State", R2-072258, XP-002503727, 3GPP TSG-RAN WG2 Meeting #58, May 11, 2007, pp. 1-44.
ETSI TS 136 300 V8.0.0, "Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.0.0 Release 8)", Mar. 2007, pp. 1-83 (84 pages).
Bormann, C. et al., "Robust Header Compression (ROHC): Framework and Four Profiles: RTP, UDP, ESP, and Uncompressed", Network Working Group Request for Comments: 3095, Jul. 2001, pp. 1-168 (148 pages).
International Search Report PCT/EP2008,058063 filed Jun. 25, 2008.
State Intellectual Property Office of the People'S Republic of China, First Office action dated Oct. 17, 2012 issued in Chinese Patent Application No. 200880104307.9, 16 pages.
Motorola, Inc., Technical white paper, Long Term Evolution (LTE): A Technical Overview, 2007, 15 pages.
3GPP TSG-RAN WG2 #59, R2-073441, "PDCP and RLC Control PDU handling", May 24, 2007, 2 pages.
Office of the Russian Federation Federal Institute of Industrial Property, Translation of Notification of the results of examination of patentability dated Jun. 13, 2012, for corresponding Russian patent application No. 2010102028/07 (002829), 3 pages.
Ericsson et al: "Introduction of Improved L2 support for high data rates and Enhanced CELL_FACH states"; R2-071875, 3GPP TSG-RAN WG2 Meeting #58, May 2007, Kobe, Japan, USA, May 7-11, 2007, pp. 1-117; http://www.3gpp.org/ftp/tsg_ran/WG2_RL2/TSGR2_58/Documents/R2-071875.zip.
Examination Report dated Jul. 29, 2016, for corresponding Indian Application No. 8553/DELNP/2009. pp. 1-9.

\* cited by examiner

MESSAGE TRANSFER FOR IN-BAND SIGNALING MESSAGES IN RADIO ACCESS NETWORKS

CROSS-REFERENCE TO RELATED APPLICATIONS

This application claims priority of U.S. Provisional Patent Application Ser. No. 60/929,369, filed on Jun. 25, 2007. The subject matter of this earlier filed application is hereby incorporated by reference.

BACKGROUND OF THE INVENTION

Field of the Invention

The present invention relates generally to communication networks. More specifically, the present invention relates to a method and apparatus for handling in-band signaling messages in radio access networks.

Description of the Related Art

In radio access networks such as evolved universal terrestrial radio access networks (E-UTRAN), datagrams such as packets or PDU's are often transmitted between network devices using various types of compression technology. Compressing aspects of the datagram such as headers and payload can improve overall system performance. In some configurations, various protocols can be used to compress and decompress aspects of the datagram. One such protocol is known as Packet Data Convergence Protocol (PDCP). Certain standards and proposed standards (for example, IETF RFC3095) require various protocols and various functionalities in order to properly operate among various devices. One such protocol is a robust header compression protocol, which is sometimes referred to as the ROHC protocol. This protocol supports a number of operation modes, including a uni-directional mode (U-mode), Bi-directional optimistic mode (O-mode), and Bi-directional reliable mode (R-mode).

In many communication protocols, various feedback systems have been implemented in order to ensure appropriate communication. For example, in ROHC, an ACK signaling acknowledges successful decompression of a packet on the decompression side of the communication. Successful decompression is defined as the context of the packet being up-to-date with a high probability. A NACK signal indicates that the dynamic context of the decompressor is out of synchronization. A NACK signal is generated when several successive packets have failed to be decompressed properly. A Static-NACK signal indicates that the static context of the decompression is not valid, or has not been established. Other in-band control signaling can also be used in the context of a packet data convergence protocol.

SUMMARY OF THE INVENTION

Certain embodiments of the present invention may provide solutions to the problems and needs in the art that have not yet been fully solved by currently available communication system technologies. For example, certain embodiments of the present invention may provide a method and apparatus for handling in-band signaling messages in radio access networks.

In one embodiment, a method may include setting up a logical channel. The logical channel may provide packet data control protocol in-band signaling for radio bearers. The method may also include providing a unique logical channel identifier for the logical channel, receiving a packet with a logical channel identifier tag, and identifying a packet data unit of the packet as a signaling packet data unit.

In some embodiments, the logical channel may be bi-directional. In certain embodiments, the logical channel may be originated and terminated in peer entities that handle packet data compression protocol. In some embodiments, setup and release of the logical channel may be automatically performed along with one or more of a first radio resource control establishment and a last release of a radio bearer having robust header compression. In certain embodiments, the method may further include transferring in-band signaling packet data units to a node of a target cell during handover in the context of a radio bearer identifier and the logical channel identifier associated with the logical channel.

In another embodiment, an apparatus may include a channel setup unit configured to setup a logical channel. The logical channel may provide packet data control protocol in-band signaling for radio bearers. The apparatus may also include an identifier providing unit configured to provide a unique logical channel identifier for the logical channel, a receiver configured to receive a packet with a logical channel identifier tag and a packet identifying unit configured to identify a packet data unit of the packet as a signaling packet data unit.

In some embodiments, the logical channel may be bi-directional. In certain embodiments, the logical channel may be originated and terminated in peer entities that handle packet data compression protocol. In some embodiments, the channel setup unit may be configured to automatically perform setup and release of the logical channel along with one or more of a first radio resource control establishment and a last release of a radio bearer having robust header compression. In certain embodiments, the apparatus may include a transferring unit configured to transfer in-band signaling packet data units to a node of a target cell during handover in the context of a radio bearer identifier and the logical channel identifier associated with the logical channel.

In another embodiment, a method may include defining un-numbered packet data convergence protocol control packet data units. The control packet data units may define in-band signaling messages for a radio bearer. The method may also include passing the control packet data units to and from a lower layer radio link control and sending the control packet data units in radio link control packet data unit format.

In some embodiments, the control packet data units may be passed to and from the lower layer radio link control via radio link control primitives on corresponding individual radio bearers or logical channels. In certain embodiments, a one-to-one mapping may exist between the radio bearers and the logical channels, and radio link control primitives may indicate a radio bearer identification to logical channel identification mapping and whether packet data control protocol signaling includes a control packet data unit or a data packet data unit. In some embodiments, the control packet data units may be applied in one or more of acknowledge mode, un-acknowledge mode and transparent mode. In certain embodiments, the method may include transferring the control packet data units to another node in handover during layer 2 context and data transfer.

In another embodiment, an apparatus may include a defining unit configured to define un-numbered packet data convergence protocol control packet data units. The control packet data units may define in-band signaling messages for a radio bearer. The apparatus may also include a passing unit configured to pass the control packet data units to and from a lower layer radio link control and a transmitter configured to send the control packet data units in radio link control packet data unit format.

In some embodiments, the passing unit is configured to pass the control packet data units to and from the lower layer radio link control via radio link control primitives on corresponding individual radio bearers or logical channels. In certain embodiments, a one-to-one mapping may exist between the radio bearers and the logical channels, and radio link control primitives may indicate a radio bearer identification to logical channel identification mapping and whether packet data control protocol signaling comprises a control packet data unit or a data packet data unit. In some embodiments, the control packet data units may be applied in one or more of acknowledge mode, un-acknowledge mode and transparent mode. In certain embodiments, the transmitter may be configured to transfer the control packet data units to another node in handover during layer 2 context and data transfer.

In yet another embodiment, a method may include setting up a logical channel. The logical channel may provide packet data control protocol in-band signaling for radio bearers. The method may also include providing a unique logical channel identifier for the logical channel and defining un-numbered packet data convergence protocol control packet data units. The control packet data units may define in-band signaling messages for a radio bearer. The method may further include passing the control packet data units to and from a lower layer radio link control.

In some embodiments, the control packet data units may be transferred during layer 2 signaling and data transfer. In certain embodiments, the logical channel may be associated with setup and configuration of a first packet data convergence protocol user entity or radio bearer of a user. In some embodiments, release of the logical channel may be associated with a release of a last radio bearer. In some embodiments, a sequence number, a radio bearer identifier and a logical channel identifier may be included in a header of the control packet data unit. In certain embodiments, the method may further include transferring packet data convergence protocol service data units without ciphering. In certain embodiments, the method may include transferring packet data convergence protocol service data units during layer 2 context in handover to a target node over an X2 interface based on a radio bearer identifier and the logical channel identifier associated with the logical channel.

In still another embodiment, an apparatus may include a channel setup unit configured to setup a logical channel. The logical channel may provide packet data control protocol in-band signaling for radio bearers. The apparatus may also include an identifier providing unit configured to provide a unique logical channel identifier for the logical channel and a defining unit configured to define un-numbered packet data convergence protocol control packet data units. The control packet data units may define in-band signaling messages for a radio bearer. The apparatus may further include a passing unit configured to pass the control packet data units to and from a lower layer radio link control.

In some embodiments, the apparatus may further include a transferring unit configured to transfer the control packet data units during layer 2 signaling and data transfer. In certain embodiments, the channel setup unit may be further configured to setup the logical channel to be associated with setup and configuration of a first packet data convergence protocol user entity or radio bearer of a user. In some embodiments, the apparatus may be configured to associate release of the logical channel with a release of a last radio bearer. In some embodiments, a header of the control packet data unit may include a sequence number, a radio bearer identifier and a logical channel identifier. In certain embodiments, the apparatus may include a transmitter configured to transmit packet data convergence protocol service data units without ciphering. In certain embodiments, the apparatus may include a transferring unit configured to transfer packet data convergence protocol service data units during layer 2 context in handover to a target node over an X2 interface based on a radio bearer identifier and the logical channel identifier associated with the logical channel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms data and packet have been used in the description of the present invention, the invention may be applied to many types of network data. For purposes of this invention, the term data includes packet, cell, frame, datagram, bridge protocol data unit packet, packet data, packet payload and any equivalents thereof.

Robust header compression feedback and in-band signaling for packet data convergence protocol according aspects of the present invention may have numerous embodiments. Some embodiments include lower-layer specific feedback mechanisms, and/or a dedicated feedback-only channel, realized by a lower layer providing a way to indicate that a packet is a feedback packet. Additionally, a dedicated feedback-only channel can be used, wherein the timing of the feedback provides information about what compressed packet resulted in the feedback.

In another configuration, feedback packets can be interspersed among normal compressed packets that are traveling in the same direction. In such a configuration, lower layers do not indicate feedback. Feedback information may alternatively be piggybacked in or on compressed packets that are traveling in the same direction. Such configuration can be desirable due to a potential reduction in per-feedback overhead. Additionally, feedback packets may be interspersed and piggybacked on a same channel in a combination solution. In radio access networks such as E-UTRAN, unique issues arise that create opportunities for unique and novel solutions regarding in-band signaling messages.

A separate logical channel may be provided for all packet data compression protocol in-band signaling for all radio bearers. Such a logical channel may be bi-directional, and can be originated and terminated in peer entities which are handling packet data compression protocol at, for example, a corresponding radio link control (RLC) service access point (SAP). Set up and release of the logical channel may be automatically performed along with a first radio resource control (RRC) establishment and/or a last release of a radio bearer (RB) configured with robust header compression (ROHC). In this configuration, the logical channel may have a unique logical channel identifier (LCID) for potential multiplexing of logical channels at the media access controller (MAC) associated with the radio link layer (RLL). Also, a transfer of packet data compression protocol in-band signaling datagrams or packets may be bound to the logical channels. In a signaling or L2 context, a data transfer for user equipment associated with handover between two nodes (which may be enhanced node Bs of 3GPP) may be performed. If in-band signaling datagrams need to be transferred to a target cell in a handover, they may be transferred in the context of the radio bearer identifier (RBID) and LCID.

Figure 1:
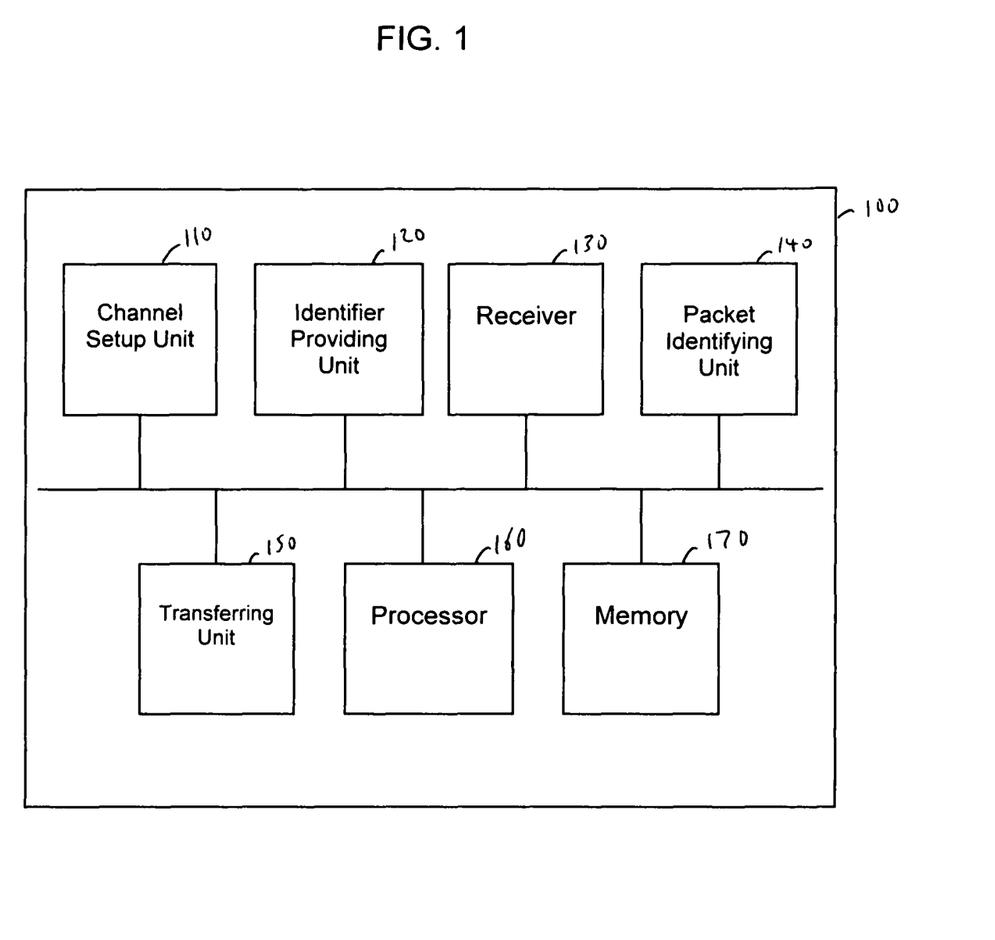
FIG. 1 is a block diagram illustrating a node for handling in-band signaling messages in radio access networks, in accordance with an embodiment of the present invention.

FIG. 1 depicts a node 100 for handling in-band signaling messages in radio access networks, in accordance with an embodiment of the present invention. The depicted node 100 includes a channel setup unit 110, an identifier providing unit 120, a receiver 130, a packet identifying unit 140, a transferring unit 150, a processor 160 and memory 170. One skilled in the art will readily understand that "node" may include a 3GPP enhanced node B (eNB), a server, a router, or any other suitable network device, or combination of devices, capable of performing the operations associated with the "node" as described herein. "Memory", as discussed herein, may be, for instance, a hard disk drive, flash device, random access memory (RAM), tape, or any other such medium used to store data.

The channel setup unit 110 may be configured to setup a logical channel. The logical channel may provide packet data control protocol (PDCP) in-band signaling for radio bearers. The identifier providing unit 120 may be configured to provide a unique LCID for the logical channel. The receiver 130 may be configured to receive a packet with an LCID tag. The packet identifying unit 140 may be configured to identify a packet data unit (PDU) of the packet as a signaling packet data unit (S-PDU).

The logical channel may be bi-directional. The logical channel may be originated and terminated in peer entities that handle packet data compression protocol. The channel setup unit 110 may be configured to automatically perform setup and release of the logical channel along with one or more of a first RRC establishment and a last release of a RB having robust header compression. In certain embodiments, the node 100 may include a transferring unit 150 configured to transfer in-band signaling PDUs to a node of a target cell during handover in the context of a RBID and the LCID associated with the logical channel.

It should be noted that many of the functional features described in this specification have been presented as units, in order to more particularly emphasize their implementation independence. For example, a unit may be implemented as a hardware circuit comprising custom very large scale integration (VLSI) circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be at least partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit. Units may be stored on a computer-readable medium, which may be, for instance, a hard disk drive, flash device, random access memory (RAM), tape, or any other such medium used to store data.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
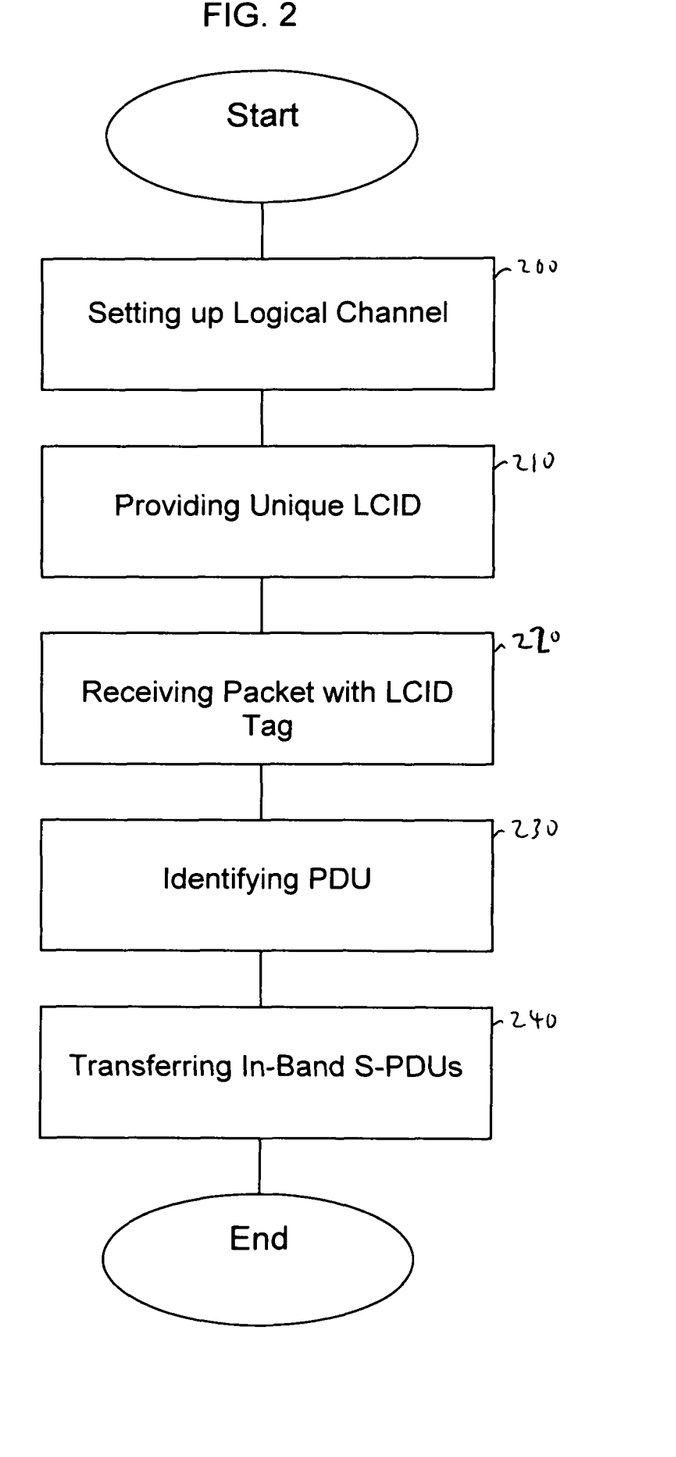
FIG. 2 is a flow diagram illustrating a method for handling in-band signaling messages in radio access networks, in accordance with another embodiment of the present invention.

FIG. 2 depicts a method for handling in-band signaling messages in radio access networks, in accordance with another embodiment of the present invention. The depicted method includes setting up a logical channel 200, providing a unique LCID 210 for the logical channel, receiving a packet with an LCID tag 220, identifying a PDU of the packet as an S-PDU 230 and transferring in-band S-PDUs 240. In certain embodiments, the operations of the method depicted in FIG. 2 may be executed by the node 100 of FIG. 1.

The logical channel may provide PDCP in-band signaling for radio bearers. The logical channel may be bi-directional. The logical channel may be originated and terminated in peer entities that handle packet data compression protocol. Setup and release of the logical channel may be automatically performed along with one or more of a first radio resource control establishment and a last release of a radio bearer having robust header compression. In certain embodiments, transferring of in-band S-PDUs 240 may include transferring the S-PDUs to a node of a target cell during handover in the context of a radio bearer identifier and the logical channel identifier associated with the logical channel.

In-band signaling messages for each RB may be defined in the form of un-numbered control datagrams or PDUs (C-PDUs). Such control datagrams may be passed to and from a lower layer radio link control (RLC) by, for example, RLC primitives on the corresponding individual RBs or logical channels. There may be a one-to-one mapping between the RB and the logical channels. The RLC primitives can indicate the RBID-to-LCID mapping and the nature of the packet data compression protocol data, such as whether the datagram is a C-PDU or data PDU. In such configuration, the C-PDU may be sent in RLC C-PDU format. Therefore, there may be an RLC C-PDU type that can carry C-PDUs for each RB.

RLC in-band control signaling may use corresponding RLC C-PDUs, and may be applied in numerous RLC modes, such as, acknowledge mode (AM), un-acknowledge mode (UM) and transparent mode (TM). The RLC C-PDUs may encapsulate PDUs of ROHC feedback. Such PDCP C-PDUs may be transferred during L2 context and data transfer in an inter-eNB handover.

Figure 3:
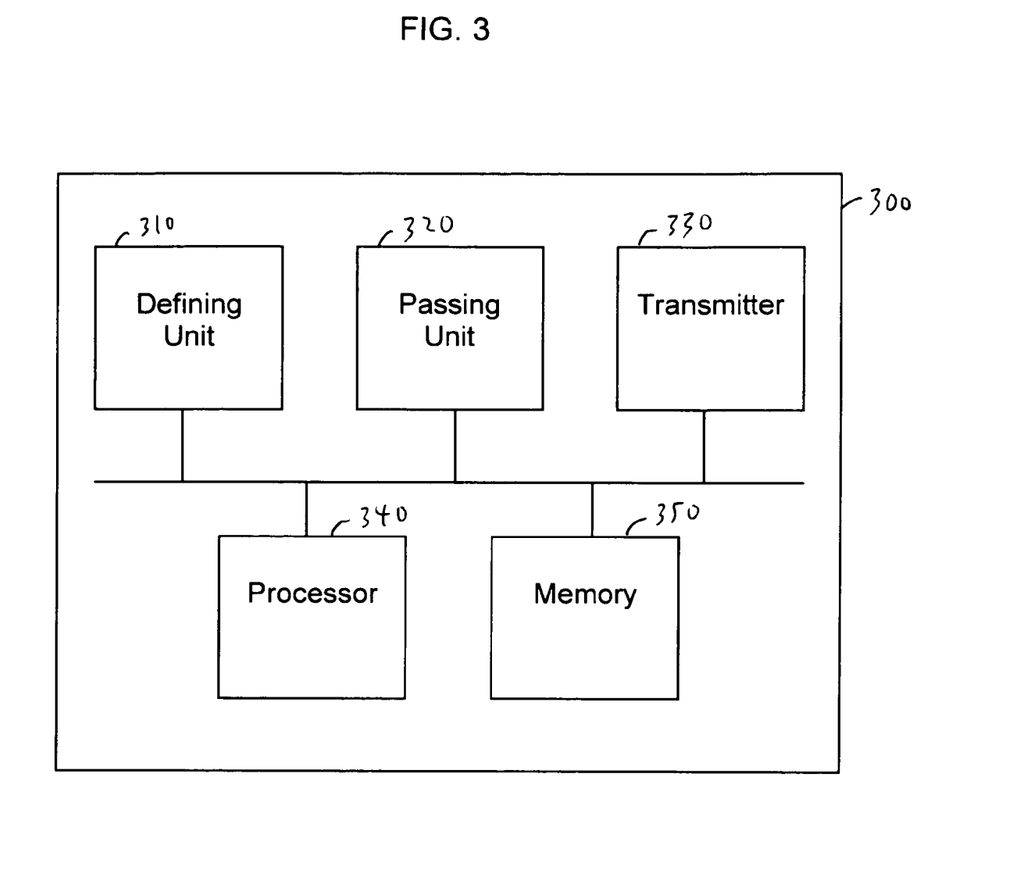
FIG. 3 is a block diagram illustrating a node for handling in-band signaling messages in radio access networks, in accordance with another embodiment of the present invention.

FIG. 3 depicts a node 300 for handling in-band signaling messages in radio access networks, in accordance with another embodiment of the present invention. The node 300 includes a defining unit 310, a passing unit 320, a transmitter 330, a processor 340 and memory 350. The defining unit 310 may be configured to define un-numbered PDCP C-PDUs. The C-PDUs may define in-band signaling messages for a RB. The passing unit 320 may be configured to pass the C-PDUs to and from a lower layer RLC. The transmitter 330 may be configured to send the C-PDUs in RLC PDU format.

The passing unit 320 may be configured to pass the C-PDUs to and from the lower layer RLC via RLC primitives on corresponding individual RBs or logical channels. A one-to-one mapping may exist between the RBs and the logical channels, and RLC primitives may indicate a RBID-to-LCID mapping and whether PDCP signaling comprises a C-PDU or a data PDU. The C-PDUs may be applied in one or more of AM, UM and TM. The transmitter 330 may be further configured to transfer the C-PDUs to another node in handover during layer 2 context and data transfer.

Figure 4:
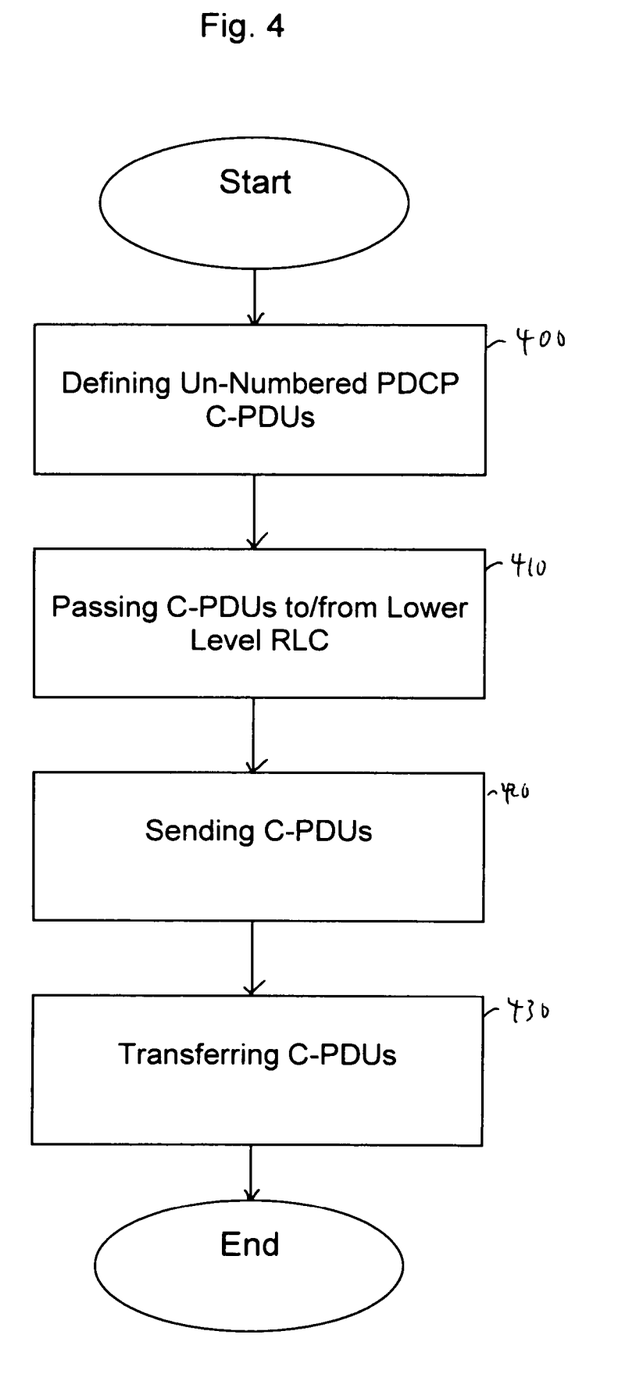
FIG. 4 is a flow diagram illustrating a method for handling in-band signaling messages in radio access networks, in accordance with another embodiment of the present invention.

FIG. 4 depicts a method for handling in-band signaling messages in radio access networks, in accordance with another embodiment of the present invention. The depicted method includes defining un-numbered PDCP C-PDUs 400, passing the C-PDUs to and from a lower layer RLC 410, sending the C-PDUs in RLC PDU format 420 and transferring the C-PDUs to another node in handover during layer 2 context and data transfer 430. In certain embodiments, the operations of the method depicted in FIG. 4 may be executed by the node 300 of FIG. 3.

The C-PDUs may be passed to and from the lower layer RLC via RLC primitives on corresponding individual RBs or logical channels. A one-to-one mapping may exist between the RBs and the logical channels, and RLC primitives may indicate a RBID-to-LCID mapping and whether PDCP signaling includes a C-PDU or a data PDU. The C-PDUs may be applied in one or more of acknowledge mode, un-acknowledge mode and transparent mode.

A combination of the embodiments noted above may also be utilized. Such a configuration may be an analogous procedure with the PDCP data transfer in the user plane. In other words, PDCP entity parameters are configured for a system architecture evolution (SAE) bearer and data is transferred via PDCP PDUs. A PDCP LCC, in addition to PDCP C-PDUs, may enable configuration of static parameters for the control channel, while avoiding overhead in each PDCP control datagram.

The PDCP C-PDU may be transferred during L2 signaling and data transfer. In this configuration, the logical channel may be configured to be associated with the setup and configuration of the first PDCP user (PDCP-u) entity or RB of a user. Accordingly, the release of the logical channel may be associated with the release of the last RB, and thus the last PDCP-e entity of the user. The configuration parameters for the PDCP control (PDCP-c) for control plane logical channels may include such features as no header compression being used, and other parameters. If a particular application requires in-sequence delivery, a sequence number may be included in the PDCP C-PDU header, along with the RBID/LCID, indicating which RB or logical channel in the PDCP C-PDU belongs to.

In this configuration, PDUs may be transferred during the handover, and the PDCP entity may be bypassed in the target node for e-NB. In the alternative, analogous with PDCP data forwarding, PDCP service data units (SDUs) without ciphering may be transferred, and a new ciphering key may be used in the PDCP of the target node. PDCP control SDUs (C-SDUs) may be transferred during L2 context, and data transfer in the e-NB handover from a source e-NB to a target eNB may occur over an interface such as the X2 interface, in a similar manner to user plane PDCP SDUs, based on the RBID-LCID of the LCC. General packet radio service (GPRS) transfer protocol identifiers may be associated with the RBID-LCID of the PDCP control signaling RB/logical channel, and the target e-NB may deliver the PDCP C-SDUs received via the X2 interface to a PDCP-C entity of the LCC created in the target eNB.

Figure 5:
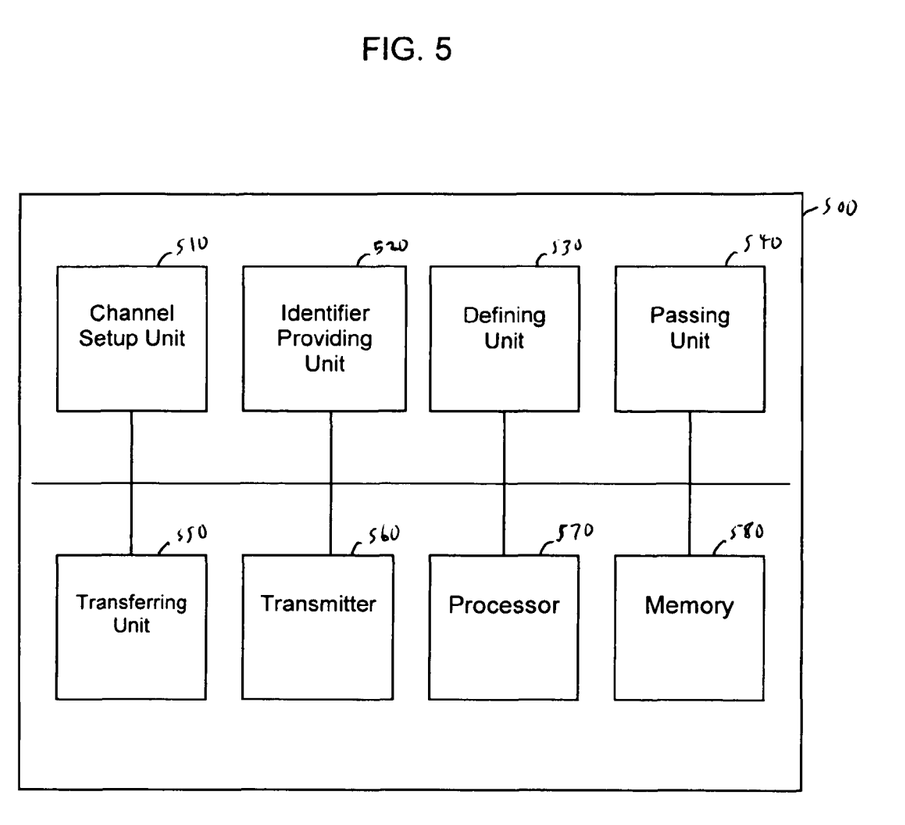
FIG. 5 is a block diagram illustrating a node for handling in-band signaling messages in radio access networks, in accordance with yet another embodiment of the present invention.

FIG. 5 is a block diagram illustrating a node 500 for handling in-band signaling messages in radio access networks, in accordance with yet another embodiment of the present invention. The depicted node 500 includes a channel setup unit 510, an identifier providing unit 520, a defining unit 530, a passing unit 540, a transferring unit 550, a transmitter, 560, a processor 570 and memory 580.

The logical channel may provide PDCP in-band signaling for RBs. The identifier providing unit 520 may be configured to provide a unique LCID for the logical channel. The defining unit 530 may be configured to define un-numbered PDCP C-PDUs. The C-PDUs may define in-band signaling messages for a RB. The passing unit 540 may be configured to pass the C-PDUs to and from a lower layer RLC.

The transferring unit 550 may be configured to transfer the C-PDUs during layer 2 signaling and data transfer. The channel setup unit 510 may be further configured to setup the logical channel to be associated with setup and configuration of a first PDCP user entity or RB of a user. The node 500 may be configured to associate release of the logical channel with a release of a last RB. A header of the C-PDU may include a sequence number, an RBID and an LCID. The transmitter 560 may be configured to transmit PDCP SDUs without ciphering. The transferring unit 550 may be configured to transfer PDCP SDUs during layer 2 context in handover to a target node over an X2 interface based on an RBID and the LCID associated with the logical channel.

Figure 6:
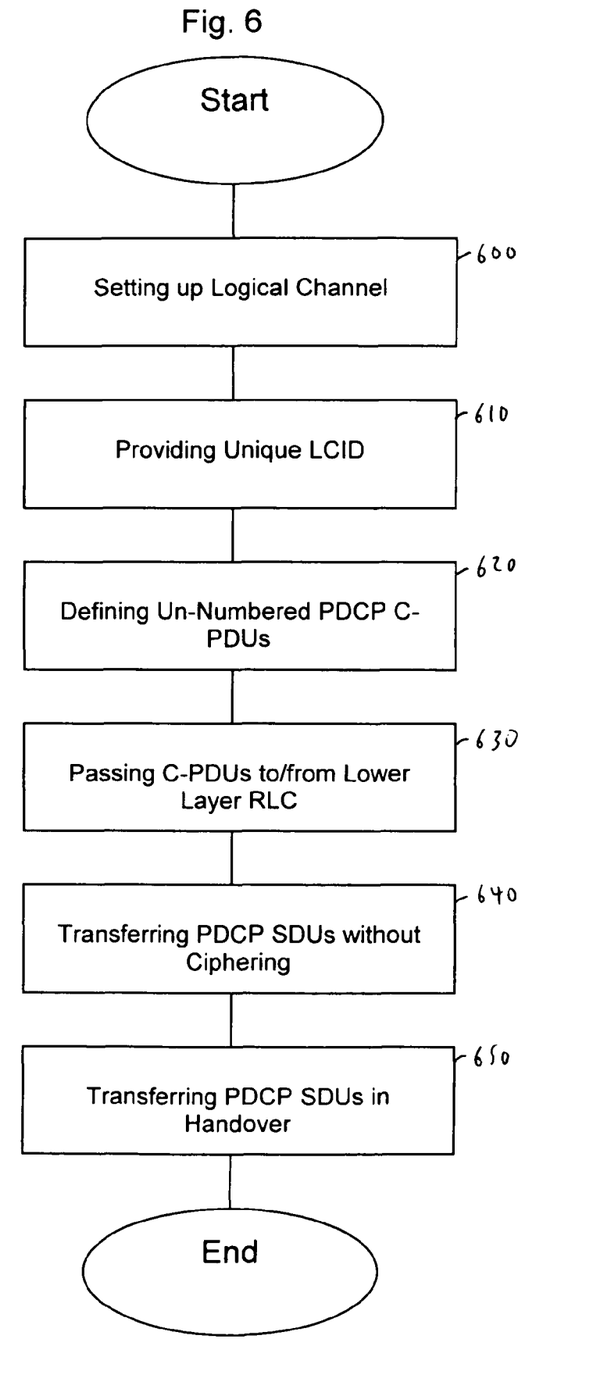
FIG. 6 is a flow diagram illustrating a method for handling in-band signaling messages in radio access networks, in accordance with still another embodiment of the present invention.

FIG. 6 is a flow diagram illustrating a method for handling in-band signaling messages in radio access networks, in accordance with still another embodiment of the present invention. The depicted method includes setting up a logical channel 600, providing a unique LCID for the logical channel 610, defining un-numbered PDCP C-PDUs 620, passing the C-PDUs to and from a lower layer RLC 630, transferring PDCP SDUs without ciphering 640 and transferring PDCP SDUs during layer 2 context in handover 650 to a target node over an X2 interface based on an RBID and the LCID associated with the logical channel.

The logical channel may provide PDCP in-band signaling for RBs. The C-PDUs may define in-band signaling messages for an RB. The C-PDUs may be transferred during layer 2 signaling and data transfer. The logical channel may be associated with setup and configuration of a first PDCP user entity or RB of a user. Release of the logical channel may be associated with a release of a last RB. A sequence number, an RBID and an LCID may be included in a header of the C-PDU.

It should be noted that an example of a logical channel is a MAC SAP based upon the function of a MAC in a RLC environment. Since there is typically a one-to-one mapping between RLC SAP and MAC SAP, certain embodiments of the invention may utilize a logical channel to provide radio link control. It should be noted that the above-discussed embodiments of the invention can be implemented in numerous configurations. Dependent upon the setup of the radio resource control, any one of a number of network entities, including user equipment, base stations, or other network devices, may configure the logical channels and provide the LCID. Similarly, any one of a number of entities may configured to define the in-band signaling messages, and to pass the control datagrams from the lower layer and effect the appropriate signaling based either on the logical channel or on the designation of control datagrams. It should also be noted that such configurations of the invention may be embodied in a semiconductor device which, when implemented in user equipment, base stations, or other network apparatus, form the various elements to perform these functions.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

We claim:

1. A method, comprising:
   defining packet data convergence protocol control packet data units within a packet data convergence protocol layer, wherein the control packet data units define signaling messages for a radio bearer;
   passing the control packet data units to and from a lower layer radio link control; and
   sending the control packet data units in radio link control packet data unit format.

2. The method of claim 1, wherein the control packet data units are passed to and from the lower layer radio link control via radio link control primitives on corresponding individual radio bearers or logical channels.

3. The method of claim 2, wherein a one-to-one mapping exists between the radio bearers and the logical channels, and radio link control primitives indicate a radio bearer identification to logical channel identification mapping and whether packet data control protocol signaling comprises a control packet data unit or a data packet data unit.

4. The method of claim 2, wherein the control packet data units are applied in one or more of acknowledge mode, un-acknowledge mode and transparent mode.

5. An apparatus, comprising:
   a defining unit configured to define packet data convergence protocol control packet data units within a packet data convergence protocol layer, wherein the control packet data units define signaling messages for a radio bearer;
   a passing unit configured to pass the control packet data units to and from a lower layer radio link control; and
   a transmitter configured to send the control packet data units in radio link control packet data unit format.

6. The apparatus of claim 5, wherein the passing unit is configured to pass the control packet data units to and from the lower layer radio link control via radio link control primitives on corresponding individual radio bearers or logical channels.

7. The apparatus of claim 6, wherein a one-to-one mapping exists between the radio bearers and the logical channels, and radio link control primitives indicate a radio bearer identification to logical channel identification mapping and whether packet data control protocol signaling comprises a control packet data unit or a data packet data unit.

8. The apparatus of claim 6, wherein the control packet data units are applied in one or more of acknowledge mode, un-acknowledge mode and transparent mode.

9. A computer program embodied on a non-transitory computer-readable medium, the program controlling a processor to perform a process, the process comprising:

defining packet data convergence protocol control packet data units within a packet data convergence protocol layer, wherein the control packet data units define signaling messages for a radio bearer;

passing the control packet data units to and from a lower layer radio link control; and sending the control packet data units in radio link control packet data unit format.

10. A method, comprising:

setting up a logical channel, wherein the logical channel provides packet data control protocol signaling for radio bearers;

providing a unique logical channel identifier for the logical channel;

defining packet data convergence protocol control packet data units within a packet data convergence protocol layer, wherein the control packet data units define signaling messages for a first radio bearer; and passing the control packet data units to and from a lower layer radio link control.

11. The method of claim 10, wherein the control packet data units are transferred during layer 2 signaling and data transfer.

12. The method of claim 10, wherein the logical channel is associated with setup and configuration of a packet data convergence protocol user entity or the first radio bearer of a user.

13. The method of claim 10, wherein release of the logical channel is associated with a release of a second radio bearer.

14. The method of claim 10, wherein a sequence number, a radio bearer identifier and a logical channel identifier are included in a header of the control packet data unit.

15. The method of claim 10, further comprising:
transferring packet data convergence protocol service data units without ciphering.

16. An apparatus, comprising:

a channel setup unit configured to setup a logical channel, wherein the logical channel provides packet data control protocol signaling for radio bearers;

an identifier providing unit configured to provide a unique logical channel identifier for the logical channel;

a defining unit configured to define packet data convergence protocol control packet data units within a packet data convergence protocol layer, wherein the control packet data units define signaling messages for a first radio bearer; and a passing unit configured to pass the control packet data units to and from a lower layer radio link control.

17. The apparatus of claim 16, further comprising:
a transferring unit configured to transfer the control packet data units during layer 2 signaling and data transfer.

18. The apparatus of claim 16, wherein the channel setup unit is further configured to setup the logical channel to be associated with setup and configuration of a first packet data convergence protocol user entity or the first radio bearer of a user.

19. The apparatus of claim 16, wherein the apparatus is configured to associate release of the logical channel with a release of a second radio bearer.

20. The apparatus of claim 16, wherein a header of the control packet data unit includes a sequence number, a radio bearer identifier and a logical channel identifier.

21. The apparatus of claim 16, further comprising:
a transmitter configured to transmit packet data convergence protocol service data units without ciphering.

22. A computer program embodied on a non-transitory computer-readable medium, the program controlling a processor to perform a process, the process comprising:

setting up a logical channel, wherein the logical channel provides packet data control protocol signaling for radio bearers;

providing a unique logical channel identifier for the logical channel;

defining packet data convergence protocol control packet data units within a packet data convergence protocol layer, wherein the control packet data units define signaling messages for a radio bearer; and passing the control packet data units to and from a lower layer radio link control.

* * * * *